Dec. 13, 1932. D. E. LINDQUIST 1,890,998
JOINT
Filed Dec. 31, 1930
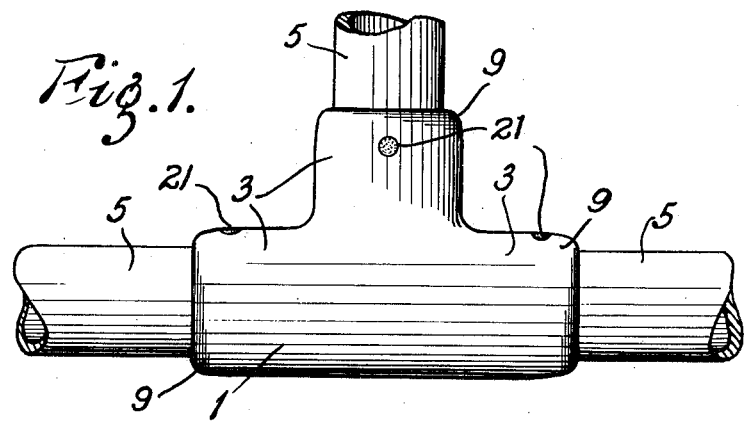
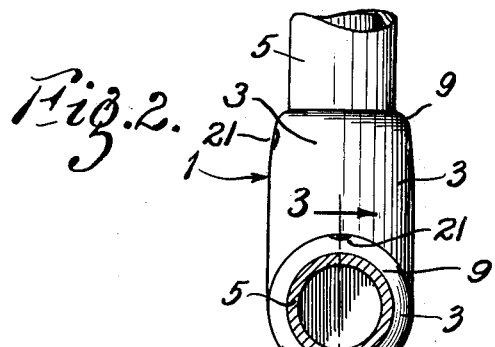
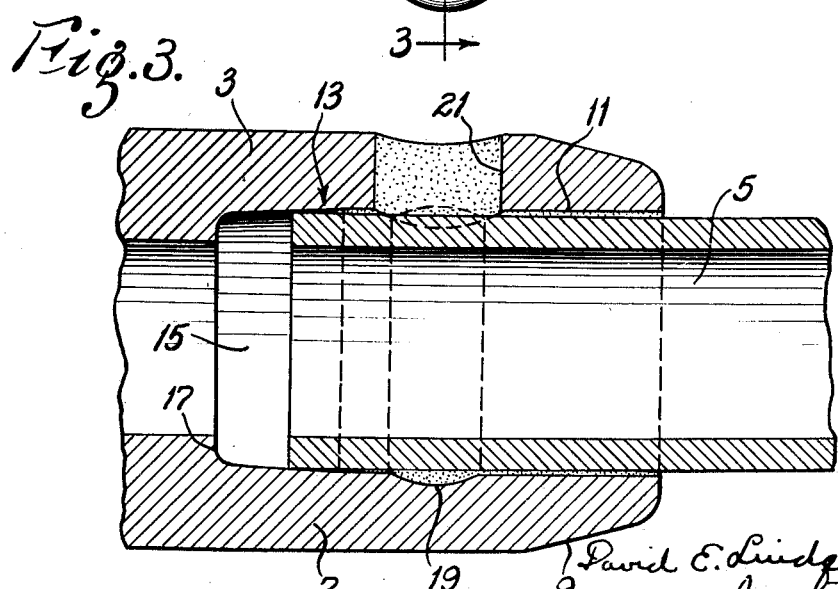
David E. Lindquist, Inventor.

Patented Dec. 13, 1932

1,890,998

UNITED STATES PATENT OFFICE

DAVID E. LINDQUIST, OF PORT HURON, MICHIGAN, ASSIGNOR TO MUELLER BRASS CO., OF PORT HURON, MICHIGAN, A CORPORATION OF MICHIGAN

JOINT

Application filed December 31, 1930. Serial No. 505,828.

This invention relates to joints, and with regard to certain more specific features, to joints between pipe or the like and fittings.

Among the several objects of the invention may be noted the provision of a sealed joint adapted to effect a connection between conduits of relatively small bore without closing off the passage through the same; the provision of a joint of the class described which shall not only be effective on small fittings and the like but which shall be operable on larger ones, particularly where it is desirable that an effective joint be made with the definite assurance that no foreign material shall enter the conduit; the provision of a device of the class described which shall effect a properly aligned joint of increased strength and rigidity; and a provision of the class described which shall be relatively simple to manufacture and assemble. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, Fig. 1 is a side elevation showing, for example, a T fitting with attached pipe;

Fig. 2 is an end view of Fig. 1; and,

Fig. 3 is a fragmentary, enlarged section taken on line 3—3 of Fig. 2.

Similar reference characters indicate corresponding parts throughout the several views of the drawing.

Referring now more particularly to Fig. 1, there is illustrated at numeral 1 a T fitting, said fitting being illustrative of one of the various types of fittings to which the invention may be applied, such as for example elbows, nipples, crosses and the like. The fitting 1 is provided with suitable outlets 3 for receiving members such as tubing or pipe 5. It is to be understood that the term "pipe" herein refers to and is representative of other members such as rods. These outlets 3 provide sockets into which the members 5 are entered. Inasmuch as the invention treats of the combination of the improved form of said outlet or socket 3, the same has been illustrated on a much enlarged scale in Fig. 3.

Referring to said Fig. 3, it will be seen that the outlet or nozzle 3 comprises an extension 7 having a tapered exterior end 9. Interiorly the nozzle 3 is formed as a socket comprising a front portion 11, which is substantially in the form of a cylinder. This cylinder 11 carries back a substantial distance to a band or region 13. Behind the band or region 13 the socket is bottomed by a rearward portion comprising a taper 15 and shoulder 17. The taper is of the order of only a few degrees, for instance two degrees.

Ahead of said band or region 13, which comprises the region of intersection between the cone forming the taper 15 and the cylinder 11, there is formed in said cylinder 11 a peripheral groove 19. This groove 19 communicates with the exterior of the socket 3 by means of an opening 21 through which solder or like sealing material is adapted to be poured.

Only a few thousandths of an inch clearance is left between the exterior of the pipe or tubing 5 and the interior of the cylinder 11 so that there is a substantial aligning action as the pipe 5 is introduced into the cylinder 11. Furthermore, the cylinder 11 is of a length which is somewhat greater than the diameter of the pipe 5, whereby alignment is assured and rigidity is accomplished after sealing.

The taper 15 is such that when the pipe 5 is introduced through the cylinder 11, said taper will be engaged by the end of the pipe. The engagement is easily made tight, because of the low angularity of the taper. After the pipe 5 has been entered, as described, external heat may be applied to the fitting and solder or similar sealing material applied to opening 21. The solder flows around the groove 19 and proceeds along the cylindrical portion 11 by capillary attraction or the like. In some applications, the amount of heat in the sealing material is enough to provide all that is required. After the proper amount of sealing material has been introduced, the heat is taken away and cooling proceeds. The reduced end of the exterior taper 9 loses its heat first and effects a solder dam which assures that the remainder of the sealing material will be properly held in place as it cools instead of running out of the fitting. The sealing material is added until the hole 21 is filled. The dam above described may even be effected as pouring occurs if external heat be not added.

The taper 15 has several advantages. One is in the fact that it definitely seals off the interior of the connection so that none of the sealing material can enter. It should be appreciated that this invention is particularly directed, in this respect, to the fittings of small pipes, such as one eighth inch, one quarter inch and the like. In the prior soldering of such fittings, inward leakage has caused a drop or bead of solder to seriously impede the travel of fluid through the connection, if not to block it entirely. The invention is applicable, however, to larger pipe if it be desirable to prevent any passage of foreign matter into the connection, even though it does not substantially clog it.

Another advantage of the taper 15 is that it effects a centralization of the pipe 5 in the cylinder 11. This means that the spacing between the pipe 5 and the cylinder 11 can be adjusted and maintained substantially equal throughout the periphery with the result that the solder film is of practically the same thickness throughout, rather than eccentric or perhaps reduced to infinitesimal thickness as when the pipe is loosely entered into and rests in an opening or socket.

It will be understood in the above, that the invention applies to any class or type of fitting which may have a soldered or like connection made. For example, copper, brass and like materials may be used. It is to be understood that the joint is to be suitably cleaned and/or fluxed prior to effecting the soldering operation.

It will be seen that the invention has the advantage of making this type of joint applicable to the smaller sizes of fittings, which was not true heretofore. It insures that the line or conduit through the joint is unobstructed. It must be remembered in this connection that in the prior art, while the joint was being made, any undesirable obstruction could not be detected. Detection was only possible after the line was put into operation. The present invention insures positively that the line is open after the joint has been made. This is of particular advantage with the smaller sizes of fittings and pipes, such as for thermostatic control lines and the like.

Taken with the above is the advantage that a uniform sealing film is insured between the pipe 5 and the cylinder 11. This effects a particularly strong and leak-proof joint.

Another advantage lies in the steadying action of the cylinder 11, because of its greater length than width, so that it functions as a guide for the pipe 5 in centering the same. Thus the person making the joint is assured of the proper alignment for maximum effectiveness of the metal to metal contact which is desired beyond the region 13. It will be understood that if the pipe is forced farther inward than shown in Fig. 3, the shoulder 17 finally limits the movement thereon. Ordinarily, this shoulder will not be put into use, said pipe stopping on the taper 15, as illustrated in Fig. 3.

It will be noted that the taper 15 starts at some distance behind the hole 21, that is the cylinder 11 is carried beyond the hole 21. This results in a complete peripheral seal by the sealing material beyond the hole 21 and the communicating groove 19.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A joint comprising, in combination, a receiving portion having a socket, said socket comprising a front substantially cylindrical portion and a rearward inwardly tapered portion, and a straight cylindrical member comprising any portion of straight pipe adapted to be received by said socket, said member being in diameter slightly less than the diameter of said front portion, but greater than the minimum diameter of said tapered portion, whereby, upon telescoping said member into said socket, the end of said member engages said tapered portion to position the side walls of said member a uniform distance from said front portion, as well as to effectively correct deviation from true shape in said member, the uniform annular space between said member and said front portion then being of such dimension as to induce capillary flow of a then liquid sealing material introduced therein, throughout said space.

2. A joint comprising, in combination, a receiving fitting portion having a socket, said socket comprising a front substantially cylindrical portion and a rearward inwardly tapered portion, and an uninterrupted cylindrical member comprising any portion of straight pipe adapted to be received by said socket, said member being in diameter slightly less than the diameter of said front portion, but greater than the minimum diameter of said tapered portion, whereby, upon telescoping said member into said socket, the end of said member engages said tapered portion to position the side walls of said member a uniform distance from said front portion, as well as to effectively correct deviation from true shape in said member, the uniform annular space between said member and said front portion then being of such dimension as to induce capillary flow of a then liquid sealing material introduced therein, throughout said space, and the positive engagement of said tapered portion and the end of said member then constituting means positively preventing the spread of such sealing material therebeyond.

In testimony whereof, I have signed my name to this specification this 26th day of December, 1930.

DAVID E. LINDQUIST.